(12) United States Patent
Lee

(10) Patent No.: US 11,036,030 B2
(45) Date of Patent: Jun. 15, 2021

(54) MEMS POSTING FOR INCREASED THERMAL DISSIPATION

(71) Applicant: SILICON LIGHT MACHINES CORPORATION, Sunnyvale, CA (US)

(72) Inventor: Sae Won Lee, Santa Clara, CA (US)

(73) Assignee: SILICON LIGHT MACHINES CORPORATION, Sunnyvale, CA (US)

( * ) Notice: Subject to any disclaimer, the term of this patent is extended or adjusted under 35 U.S.C. 154(b) by 197 days.

(21) Appl. No.: 16/430,964

(22) Filed: Jun. 4, 2019

(65) Prior Publication Data

US 2020/0026027 A1   Jan. 23, 2020

Related U.S. Application Data

(60) Provisional application No. 62/685,761, filed on Jun. 15, 2018.

(51) Int. Cl.
*G02B 26/08* (2006.01)
*G02B 7/18* (2021.01)

(52) U.S. Cl.
CPC .......... *G02B 7/181* (2013.01); *G02B 26/0841* (2013.01)

(58) Field of Classification Search
None
See application file for complete search history.

(56) References Cited

U.S. PATENT DOCUMENTS

| | | | |
|---|---|---|---|
| 7,030,824 B1 * | 4/2006 | Taft | H01Q 3/46 342/368 |
| 7,300,162 B2 | 11/2007 | Huibers | |
| 8,724,200 B1 * | 5/2014 | Wu | G02B 26/0858 359/224.1 |
| 8,975,744 B1 * | 3/2015 | Lerma | H01L 23/66 257/724 |
| 9,023,688 B1 * | 5/2015 | Or-Bach | H01L 23/3677 438/122 |
| 9,116,344 B2 | 8/2015 | Wu et al. | |
| 10,115,663 B2 * | 10/2018 | Or-Bach | H01L 27/088 |

(Continued)

OTHER PUBLICATIONS

International Search Report for International Application PCT/US19/37374 dated Sep. 4, 2019.

(Continued)

*Primary Examiner* — Jennifer D. Carruth
(74) *Attorney, Agent, or Firm* — William Nuttle

(57) ABSTRACT

A Micro-Electromechanical System (MEMS) device having improved thermal management, and methods of fabricating the same are described. Generally, the device includes a piston layer suspended over a surface of a substrate by posts at four corners thereof, the piston layer including an electrostatically deflectable piston and a number of flexures through which the piston is coupled to the posts. A faceplate including an aperture through which the piston is exposed is suspended over the piston layer. Thermal sinking structures project from the surface of the substrate and extend through void spaces between the posts, the flexures and the piston of the piston layer to provide thermal management of the piston layer. The thermal posts substantially fill the void spaces without contacting either the flexures or the piston, and without altering a deflection gap between the piston and the surface of the substrate. Other embodiments are also described.

20 Claims, 13 Drawing Sheets

(56) References Cited

U.S. PATENT DOCUMENTS

| | | | | |
|---|---|---|---|---|
| 10,444,492 B2* | 10/2019 | Hopkins | ............ | G02B 26/0841 |
| 2002/0131682 A1* | 9/2002 | Nasiri | ................... | B81B 3/0062 |
| | | | | 385/18 |
| 2007/0018065 A1* | 1/2007 | Denatale | ............ | G02B 26/0841 |
| | | | | 248/281.11 |
| 2007/0228869 A1* | 10/2007 | Aksyuk | .................. | H02N 1/008 |
| | | | | 310/309 |
| 2008/0285112 A1* | 11/2008 | Ishii | ................... | G02B 26/0841 |
| | | | | 359/290 |
| 2012/0086135 A1* | 4/2012 | Thompson | .......... | H01L 23/5389 |
| | | | | 257/787 |
| 2014/0168751 A1* | 6/2014 | Suzuki | ............... | G02B 26/0833 |
| | | | | 359/291 |
| 2014/0332975 A1* | 11/2014 | Raorane | ............ | H01L 23/49822 |
| | | | | 257/774 |
| 2019/0252357 A1* | 8/2019 | Uemura | ................... | H01L 24/73 |
| 2020/0035894 A1* | 1/2020 | Kryskowski | ............ | H01L 35/32 |
| 2020/0150382 A1* | 5/2020 | Yang | ..................... | G02B 7/181 |
| 2020/0381398 A1* | 12/2020 | Lan | ......................... | H01L 25/18 |

OTHER PUBLICATIONS

Written Opinion of International Searching Authority Application PCT/US19/37374 dated Sep. 4, 201.

* cited by examiner

MEMS POSTING FOR INCREASED THERMAL DISSIPATION

CROSS-REFERENCE TO RELATED APPLICATIONS

This application claims the benefit of priority under 35 U.S.C. 119(e) to U.S. Provisional Patent Application Ser. No. 62/685,761, filed Jun. 15, 2018, which is incorporated by reference herein in its entirety.

TECHNICAL FIELD

The present invention relates generally to a Micro-Electromechanical System (MEMS) devices and more particularly to MEMS-based optical modulators and methods of manufacturing the same to improve thermal management.

BACKGROUND

Micro-Electro-Mechanical Systems devices, or MEMS, are a category devices formed by integrating mechanical elements, sensors, actuators, and electronics onto a common or shared substrate using semiconductor fabrication techniques. One type of MEMS, referred to hereinafter as a MEMS-based optical modulator, finding increasing use in various applications, including display systems, printing, maskless lithography, three dimensional (3D) printing, selective laser melting, sintering, and oxidation or ablation of a material on a workpiece.

An embodiment of a MEMS-based optical modulator, known as a Planar Light Valve (PLV™) and commercially available from Silicon Light Machines, Inc., of Sunnyvale, Calif. is shown in FIG. 1. Referring to FIG. 1, the MEMS-based optical modulator 100 generally includes a piston layer 102 suspended over a surface of a substrate 104 by posts 106 at corners of the piston layer and/or modulator. The piston layer 102 includes an electrostatically deflectable piston 102a and a number of flexures 102b through which the piston is flexibly or movably coupled to the posts. A faceplate 108 including an aperture 110 through which the piston 102a is exposed is suspended over the piston layer 102. The modulator 100 further includes a first light reflective surface 112 on a top surface of the faceplate 108, and a second reflective surface 114 over the a top surface of the piston 102a. The second light reflective surface 114 can either be formed directly on the top surface of the piston 102a, or, as in the embodiment shown, on a mirror 116 supported above and separated from the piston 102a by a central post 118 extending from the piston to the mirror. The first and second light reflective surfaces 112, 114, have equal area and reflectivity so that in operation electrostatic deflection of the piston 102a caused by electrodes (not shown in this figure) in the piston and the substrate 104 brings light reflected from the first light reflective surface into constructive or destructive interference with light reflected from the second light reflective surface.

One problem with MEMS-based optical modulator in general, and those used in systems or applications using a high power light source, such as a high power laser, in particular is that the high power light source used can cause overheating of materials and structures in the MEMS, leading to distortion and even volatilize materials, reducing the reflectivity and operating life of the MEMS-based optical modulator.

Accordingly, there is a need for enhanced reflectivity MEMS light modulators with enhanced thermal management for high-power laser processing systems.

SUMMARY

A Micro-Electromechanical System (MEMS) device having improved thermal management, and methods of fabricating the same are described.

In a first aspect, the device includes an electrostatically deflectable piston layer suspended over a surface of a substrate by posts at four corners thereof, the piston layer including a piston and a number of flexures through which the piston is coupled to the posts. A faceplate including an aperture through which the piston is exposed is suspended over the piston layer. Large, thermal sinking structures project from the surface of the substrate and extend through void spaces between the posts, the flexures and the piston of the piston layer to provide thermal management of the piston layer. The thermal posts substantially fill the void spaces without contacting either the flexures or the piston, and without altering a deflection gap between the piston and the surface of the substrate.

In another aspect, a method for fabricating a MEMS device having improved thermal management is provided. Generally, the method includes or involves depositing and patterning a first sacrificial layer over a surface of a substrate, followed by depositing a mechanical layer on the patterned first sacrificial layer to form posts at corners of the MEMs device, and to form a piston layer including a piston and a number of flexures through which the piston is coupled to the posts. Next, a second sacrificial layer is deposited over the mechanical layer and exposed parts of the sacrificial layer, and the first and second sacrificial layers patterned to form openings for a number of large, thermal sinking structures, the openings extending from the surface of the substrate to a top surface of the second sacrificial layer. Finally, the first and the second sacrificial layers are at least partially removed to release the piston layer, and so that the thermal sinking structures substantially fill void spaces in the piston layer between the posts, the flexures and the piston of the piston layer without contacting either the flexures or the piston. In some embodiments, thermal sinking structures are formed by patterning the first sacrificial layer and the second sacrificial layer separately.

It will be understood that because the thermal sinking structures have higher thermal conductivity than an air/gas filling the void as the previous designs, better thermal management is provided. The method provides first thermal gaps separating the thermal sinking structures from the flexures and the piston, without altering a deflection gap between the piston and the surface of the substrate. In some embodiments, the openings for the thermal sinking structures have an annular cross-section in a plane parallel to the surface of the substrate, and comprise a first material enclosing a portion of material of the first and second sacrificial layers. In one version of this embodiment the first material comprises silicon germanium (SiGe) and the material of the first and second sacrificial layers germanium (Ge).

BRIEF DESCRIPTION OF THE DRAWINGS

Embodiments of the present invention will be understood more fully from the detailed description that follows and from the accompanying drawings and the appended claims provided below, where:

DETAILED DESCRIPTION

Figure 1:
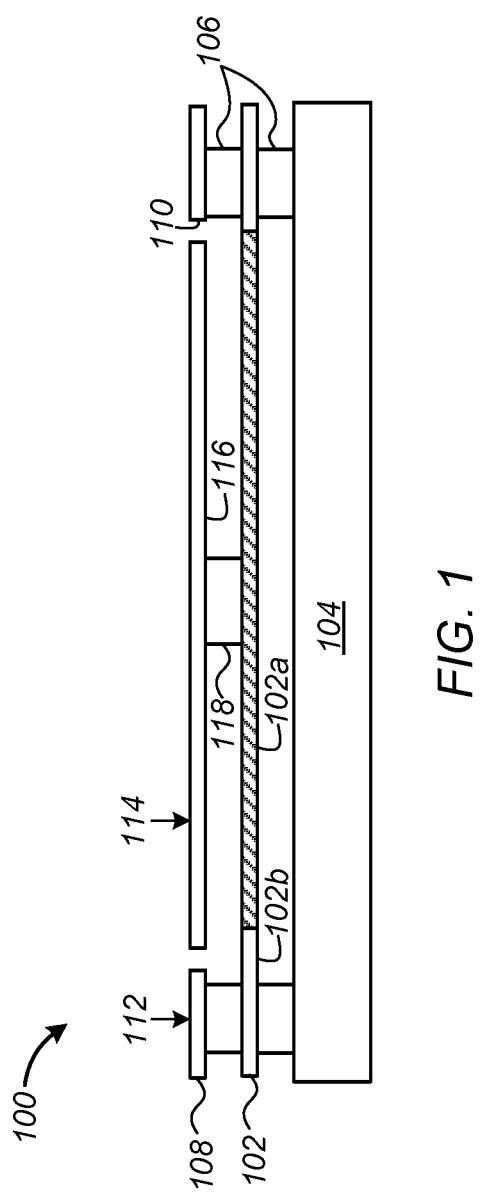
FIG. 1 is a schematic block diagram of a sectional side of a Planar Light Valve (PLV™)

Embodiments of a Micro-Electromechanical System (MEMS) based optical modulator with large, thermal posts proximal to a piston layer and connected to a faceplate layer to provide improved thermal management and to methods of manufacturing the same are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding of the present invention. In other instances, well-known semiconductor design and fabrication techniques have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming operations deposit, modify and remove films relative to a starting substrate without consideration of the absolute orientation of the substrate.

Briefly, in a first aspect this disclosure is directed to a Planar Light Valve (PLV™) including large, thermal sinking structures projecting from a surface of a substrate on or over which the PLV™ is formed that extend through void spaces between posts, flexures and the piston of a piston layer to provide thermal management of the piston layer.

An embodiment of a piston layer will now be described with reference to FIGS. 2A and 2B. For purposes of clarity, many of the details of MEMS optical modulators in general and PLV™ in particular that are widely known and are not relevant to the present invention have been omitted from the following description. The drawings described are only schematic and are non-limiting. In the drawings, the size of some of the elements may be exaggerated and not drawn to scale for illustrative purposes. The dimensions and the relative dimensions may not correspond to actual reductions to practice of the invention.

Figure 2B:
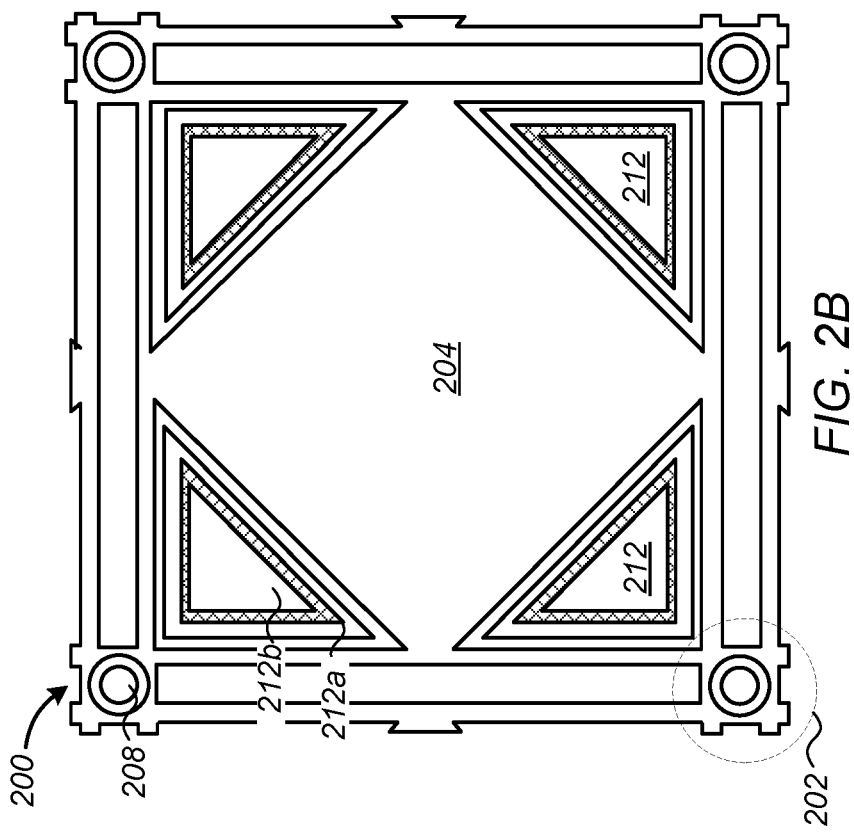
FIG. 2B is a plan view of a portion of a MEMS including a piston layer of a PLV™ and large, thermal posts according to an embodiment of the present disclosure.
Figure 2A:
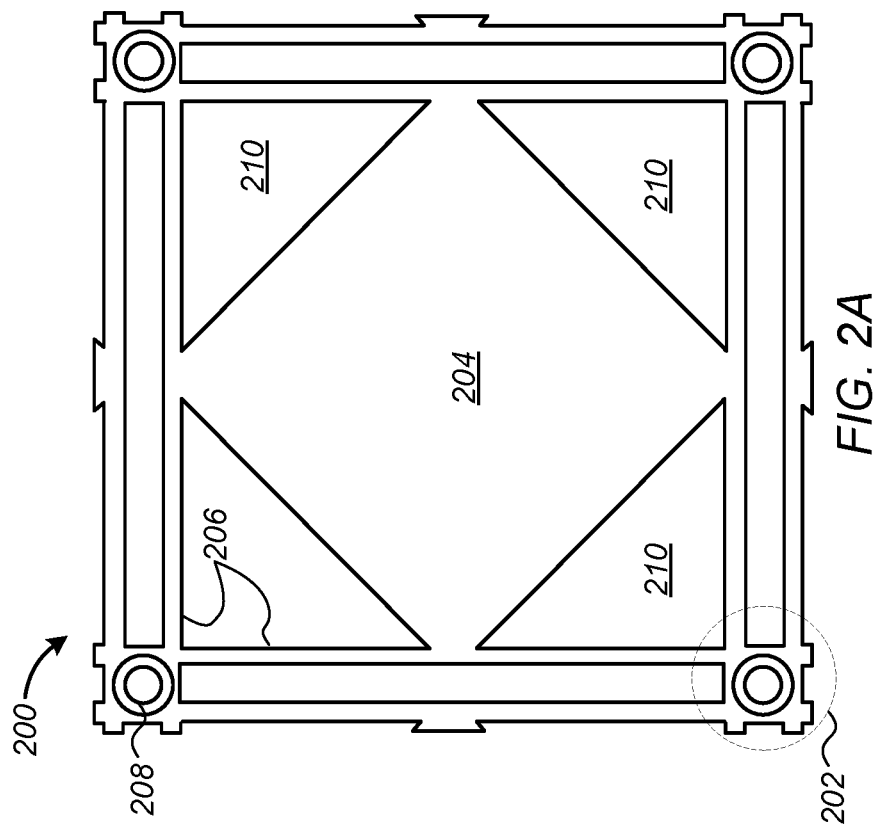
FIG. 2A is a top view of a lower MEMS or piston layer of a PLV™.

Referring to FIG. 2A, the piston layer 200 includes a taut or tensile layer of material, such as a silicon nitride (SiN) or silicon germanium layer (SiGe) suspended over and separated from a surface of a substrate (not shown in this figure) by posts 202 at four corners thereof. The piston layer 200 includes an electrostatically deflectable piston 204 and a number of flexures 206 through which the piston is coupled to the posts 202. In operation, the electrostatically deflectable piston 204 is deflected towards a lower electrode formed in or on the substrate by electrostatic forces generated when a voltage is applied between the lower electrode and an electrode layer formed on an upper or lower surface of the piston. One or more of the posts can include an electrically conductive via 208 (as in the embodiment shown) or a conducting layer on an outer surface of the post (not shown), through which the electrode layer is coupled to integrated drive circuitry formed in or electrically coupled to the substrate. Alternatively, either or both of the piston layer 200 and the posts 202 can be formed of an electrically conductive material, such as silicon germanium, to serve as the piston electrode and an electrical interconnect between the piston electrode and the substrate, respectively.

Referring again to FIG. 2A, it is noted that in previous embodiments of a PLV™, patterning of the piston layer 200 results in large, void spaces 210 spaces between the posts 202, the flexures 206 and the piston 204 of the piston layer. As noted above these voids are problematic along with the narrow flexures 206 designed to manage operation voltage because they reduce available paths through which heat can transferred from the piston 204.

Referring to FIG. 2B, in one embodiment of a PLV™ according to the present disclosure the PLV™ further includes a plurality of large, thermal sinking structures 212 or thermal posts projecting from the surface of the substrate and extending through void spaces 210 between the posts 202, the flexures 206 and the piston 204 of the piston layer 200 to provide thermal management of the piston layer. The thermal sinking structures 212 substantially fill the void spaces 210 without contacting either the flexures 206 or the piston 204 to provide first thermal gaps separating the thermal sinking structures from the flexures and the piston, and without altering a deflection gap between the piston and the surface of the substrate.

Referring again to FIG. 2B, in one embodiment the thermal sinking structures 212 can have an annular cross-section in a plane parallel to the surface of the substrate, and include a first material 212a enclosing a second material 212b instead of having air void inside for a greater thermal conductivity. In one version of this embodiment, described in greater detail below with reference to FIGS. 6, and 7A through 7F, the piston layer 200, posts 202, and thermal sinking structures 212 can be formed by steps including depositing, patterning and subsequently removing a sacrificial layer (not shown in this figure) to release the electrostatically deflectable piston 204. The thermal sinking structures 212 can include annular or ring shaped first material, which may or may not be formed from the same material as the piston layer 200, surrounding a central portion or core of the sacrificial material that forms the material 212b. For example, the thermal sinking structures 212 and the piston layer 200 can include annular ring of SiGe surrounding a core of Ge.

Alternatively, the thermal sinking structures 212 can include substantially solid structures or posts consisting of a single material or a homogeneous composition of materials selected for mechanical and heat transfer properties, and which are compatible with MEMS fabrication processes and materials of the PLV™.

Figure 3A:
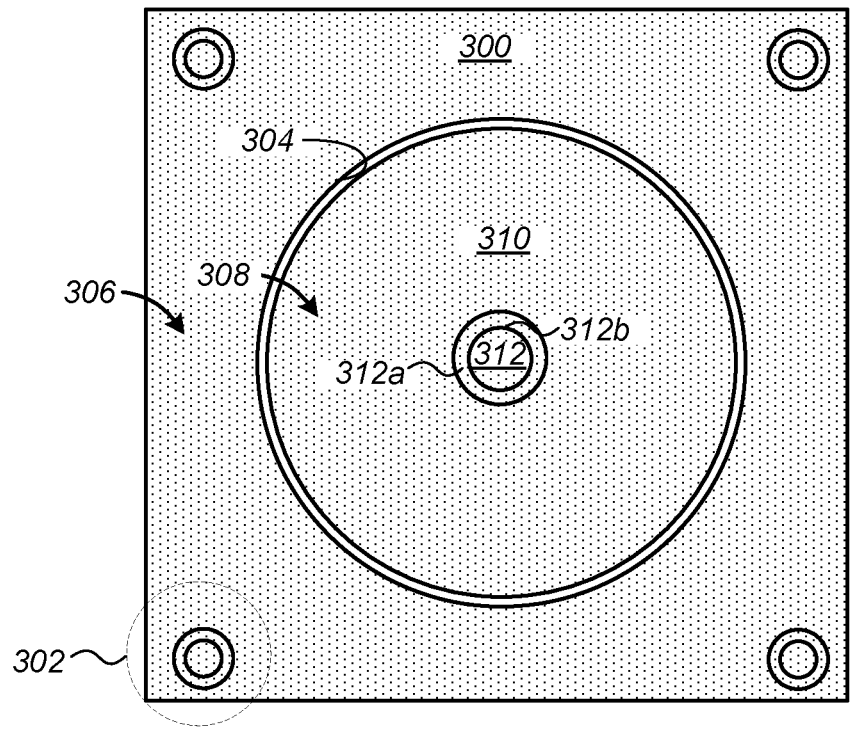
FIG. 3A is a top view of an upper MEMS layer of a PLV™ including a faceplate and reflector coupled to the piston layer.
Figure 3B:
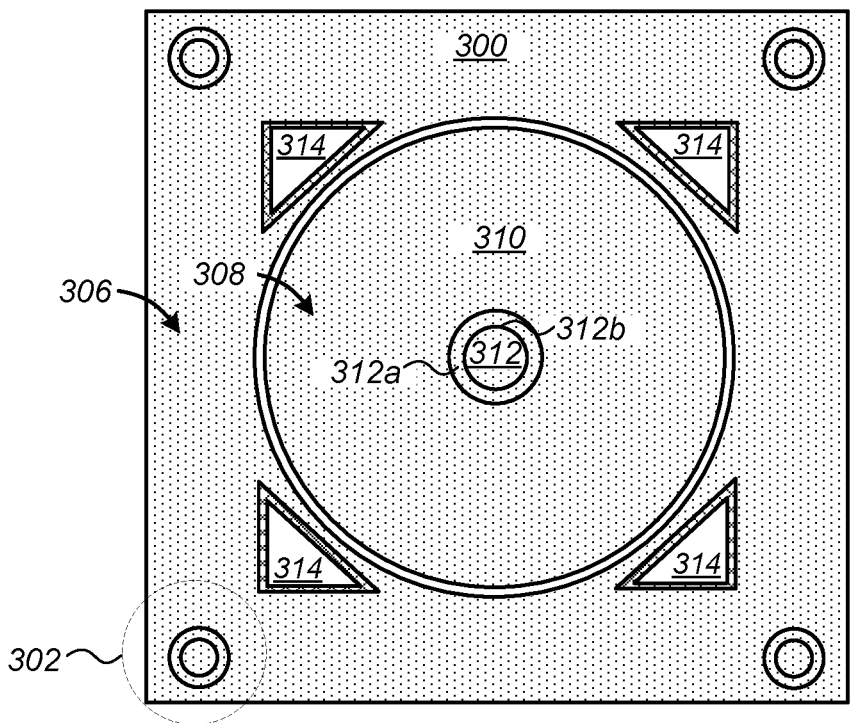
FIG. 3B is a top view of an upper MEMS layer of a PLV™ including a faceplate and reflector coupled to the piston layer, and further including large, thermal posts attached to the faceplate to provide improved thermal management according to an embodiment of the present disclosure.

Referring to FIGS. 3A and 3B the PLV™ generally further includes a faceplate 300 suspended by posts 302 (shown in phantom view) over the piston layer 200 of FIGS. 2A and 2B, and including an aperture 304 through which the piston 204 of the piston layer is exposed. The faceplate 300 includes a first light reflective surface 306 on a top surface of the faceplate, and the piston 204 includes a second light reflective surface 308 over the a top surface of the piston, which can be brought into constructive or destructive interference with light reflected from the first light reflective surface by controlling electrostatic deflection of the piston. In the embodiment shown the second reflective surface 308 is on a mirror 310 supported above and separated from the piston 204 by a central post 312 (shown in phantom view) extending from the piston to the mirror. Generally, in this embodiment the first and second light reflective surfaces 306, 308 are co-planar when the PLV™ is in a quiescent or undriven state. In some versions of this embodiment (such as that shown), the central post 312 is adapted to transfer heat from the mirror 310 to the piston 204. As with embodiments of the thermal sinking structures 212 described above, the central post 312 can include annular-ring shaped cross-section in a plane parallel to the top surface of the piston 204. The annular-ring shaped central post 312 can include a first material 312a, which may or may not be formed from the same material as the piston 204 or mirror 310, enclosing an open cavity (not shown) in a center of the central post, or the first material 312a can surround a central portion or core of a second material 312b, as in the embodiment shown. For example, the central post 312 can include an annular ring of SiGe surrounding a core of Ge. It will be understood that in those embodiments in which the annular-ring shaped central post 312 includes the first material 312a enclosing an open cavity. The central post further includes an opening in the first material 312a through which a sacrificial material can be removed to form the open cavity in the central post.

Alternatively, in another embodiment (not shown) the mirror 310 and second reflective surface 308 can be formed directly on the piston 204 below the plane of the faceplate 300 and first reflective surface 306. Generally, in this embodiment the faceplate 300 from the piston layer 200 are arranged so that a distance separating the first light reflective surfaces 306 from the second light reflective surfaces 308, in the quiescent or undriven state is equal to or slightly less than one quarter wavelength (¼ λ) of a coherent or laser light to be reflected from the surfaces.

In one embodiment, the thermal sinking structures 212 (not shown in FIG. 3A) extend through or past the piston layer 200 to a position just under and proximal to the faceplate 300 without contacting the faceplate forming second thermal gaps between the thermal sinking structures and the faceplate to provide thermal management of the faceplate.

Alternatively in another embodiment shown in FIG. 3B, the PLV™ includes thermal sinking structures 314 (shown in phantom view) that extend through the piston layer 200 to connect with the faceplate 300 to suspend the faceplate over the piston layer, and to provide thermal management of the faceplate. As in the embodiments of the thermal sinking structures 212 described above with reference to FIG. 2B, the thermal sinking structures 314 can include an annular-ring shape comprising first and second materials, or a substantially solid structure consisting of a single material or a homogeneous composition of material. In some versions of this embodiment the thermal sinking structures 314 can include an electrically conductive material to electrically couple the faceplate to a potential or voltage, such as ground, in the substrate. As with posts 202 described above the electrically conductive material can include an electrically conductive via in a center of the thermal sinking structure 314, an electrically conductive on an outer surface of the thermal sinking structure, or the thermal sinking structure itself can be made of an electrically conductive material.

Figure 4A:
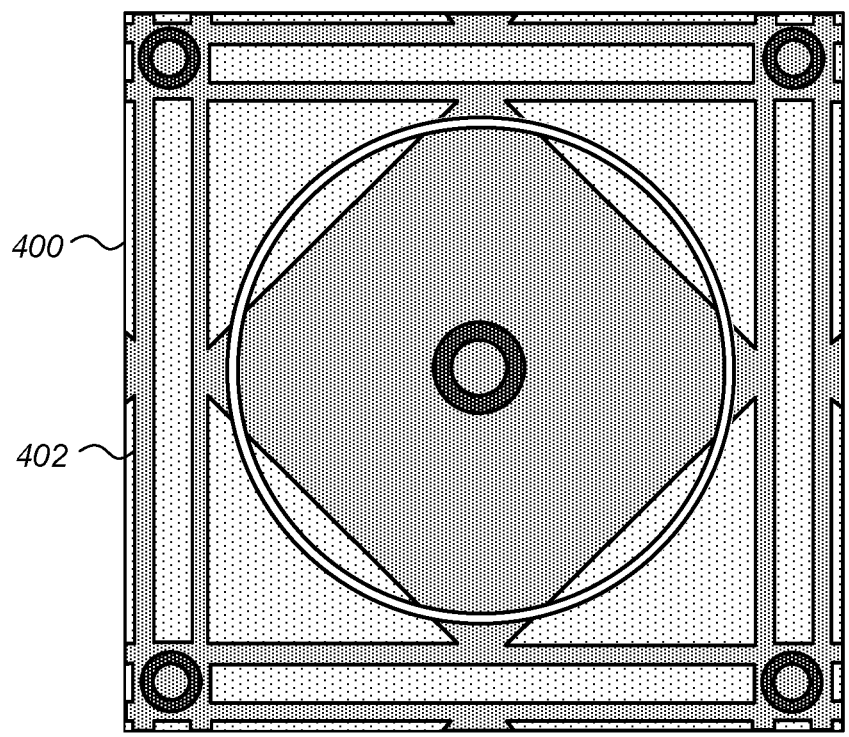
FIG. 4A is a top view of the upper and lower MEMS layers of a PLV™.

A top view of a PLV™ including a faceplate 400 and piston layer 402 (in phantom) is shown in FIG. 4A. This figure can represent a conventional or prior art PLV™ or a PLV™ in which thermal sinking structures (not shown in this figure) according to the present disclosure do not extend past the piston layer 402 to contact the faceplate 400.

Figure 4B:
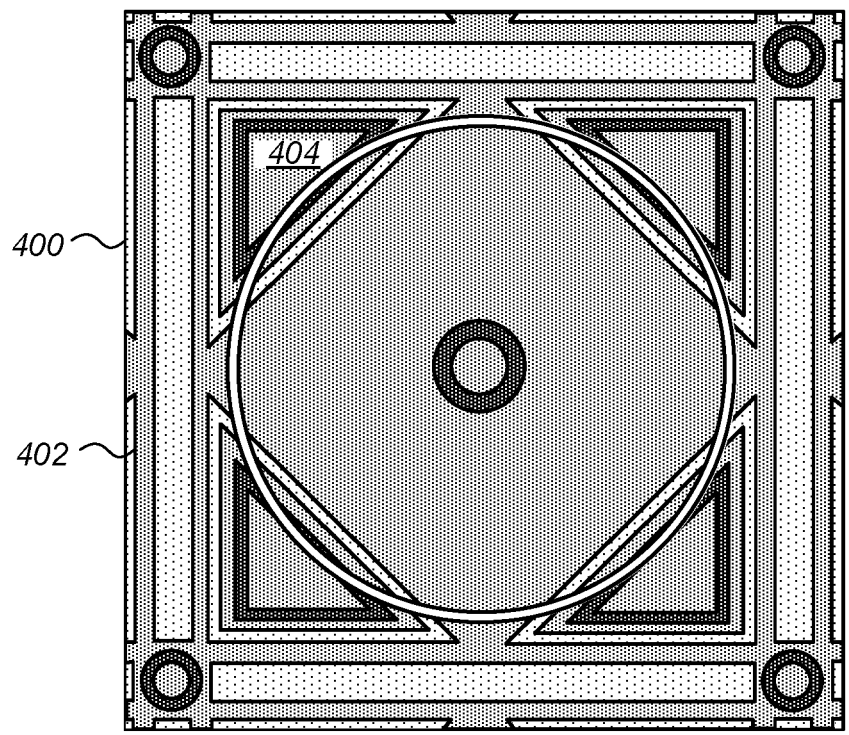
FIG. 4B is a top view of the upper and lower MEMS layers of a PLV™ including large, thermal posts attached to the faceplate to provide improved thermal management according to an embodiment of the present disclosure.

FIG. 4B is a top view of the faceplate 400 and piston layer 402 of a PLV™ including large, thermal sinking structures 404 (shown in phantom) attached to a lower surface of the faceplate.

Figure 5A:
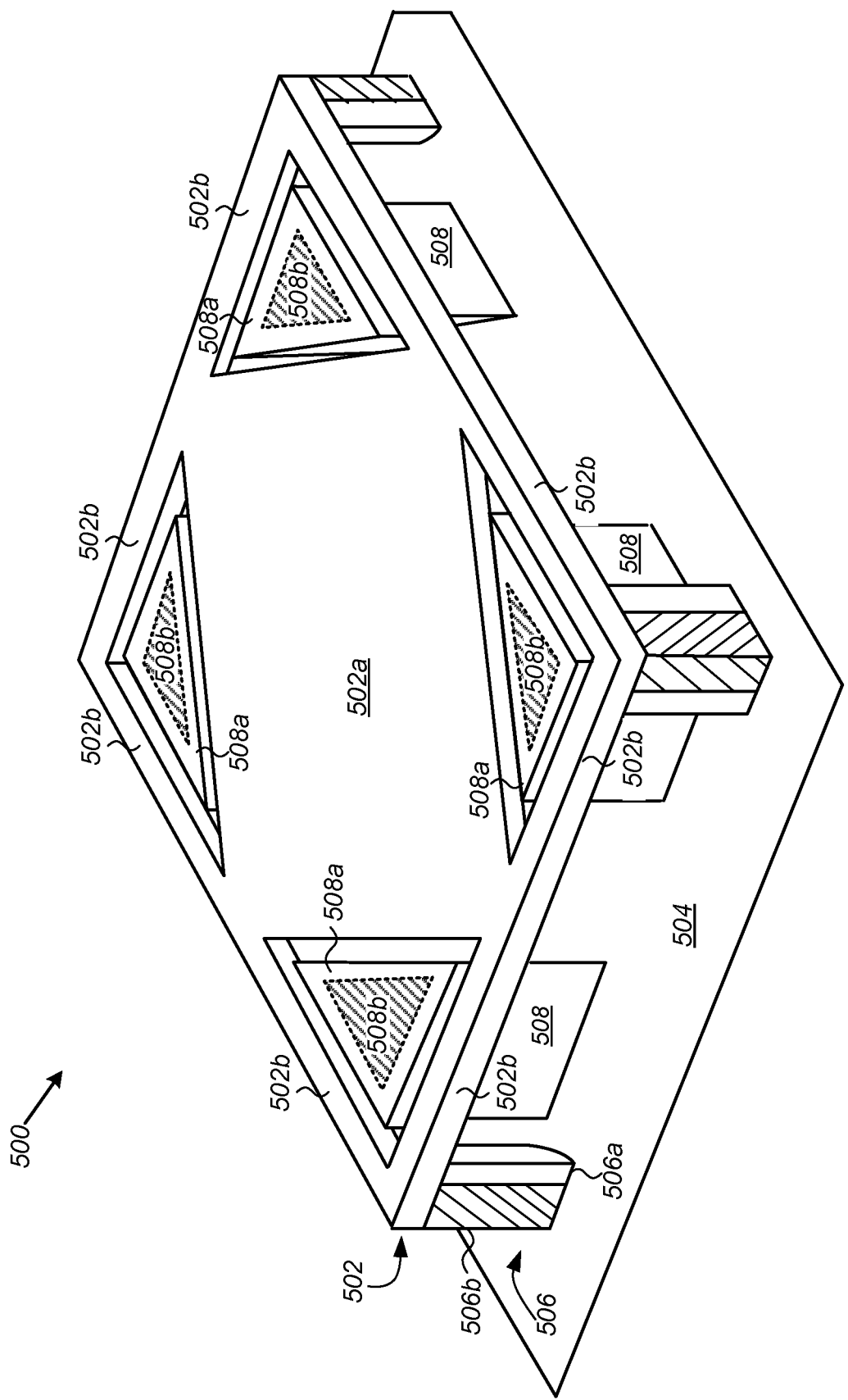
FIG. 5A is a perspective view of a lower MEMS or piston layer of a PLV™ including large, thermal sinking structures filling previously void areas according to an embodiment of the present disclosure.

FIGS. 5A through 5D are perspective views of a portion PLV™ showing a first MEMS or piston layer and a second MEMS or faceplate layer, and having thermal sinking structures according to certain embodiments of the present disclosure, including those described above. In particular, FIG. 5A is a perspective view of a first MEMS or piston layer 502 of an incomplete PLV™ 500 suspended above a substrate 504 by a number of posts 506 in corners thereof, and including large, thermal sinking structures 508 substantially filling previously void areas in the piston layer as described above to provide thermal management of the piston layer. The piston layer 502 includes an electrostatically deflectable piston 502a and a number of flexures 502b through which the piston is flexibly or movably coupled to the posts 506. The posts 506 can include an annular structure including an outer or first material 506a surrounding either a substantially hollow inner region or, as shown, a second material 506b. The first and second materials of the posts 506 can include a dielectric, conductive, or semiconductor material, selected to be compatible with the material and processes used to form the PLV™. Generally as described above at least one of the first or second materials of at least one of the posts 506 includes a conductive or semiconductor material to electrically couple an electrode (not shown in this figure) in or on the piston 502a to integrated drive circuitry (not shown in this figure) formed in or electrically coupled to the substrate 504.

As also described above, in the embodiment shown in FIG. 5A the thermal sinking structures 508 include ends or upper surfaces substantially co-planar with an upper surface of the piston layer 502, and which do not extend substantially through or past the piston. The thermal sinking structures 508 can include a solid, homogeneous structure or an annular structure including an outer or first material 508a surrounding either a substantially hollow inner region or a second material 508b, as shown in FIG. 5D. The first and second materials of the thermal sinking structures 508 can include a dielectric, conductive, or semiconductor material. In one embodiment, the thermal sinking structures 508 include SiGe surrounding a core of Ge. An outer or first material 508a including SiGe is desirable as providing resistance to etchants used in forming the PLV™, while also providing a conductive path to electrically couple an electrode in or on the piston 502a to integrated drive circuitry in or electrically coupled to the substrate 504. The annular structure of the thermal sinking structures 508 is desirable as enabling the thermal sinking structures to have a large outer surface area, substantially filling void spaces between the posts 506, the flexures 502b and the piston 502a of the piston layer 502, without requiring excessive deposition of a conformal layer of the first material of the of the thermal sinking structures. As explained in further detail below this is particularly advantageous when the first material of the first material 508a of the thermal sinking structures 508 is deposited in a single step concurrent with, for example forming the piston layer 502 and or the posts 506. In some embodiment, such as that shown in FIG. 5D, the inner core or region of the thermal sinking structures 508 is not hollow, but is filled with a second material 508b, such a germanium (Ge) having an greater thermal conductivity than the first material 508a. Silicon-germanium (SiGe) has a thermal conductivity, depending on the ratio of silicon to germanium of from about 0.085 W/cm-° C. to about 0.11 W/cm-° C., while germanium (Ge) has a thermal conductivity of about 0.6 W/cm-° C. As explained in further detail below germanium (Ge) is also suitable as a sacrificial material useful in forming the PLV™, thus eliminating the need for a separate deposition step to deposit the second material 508b. It is further noted that use of Ge as a sacrificial material also enables easy replacement of void while easily maintaining planarity of a second sacrificial layer.

Figure 5B:
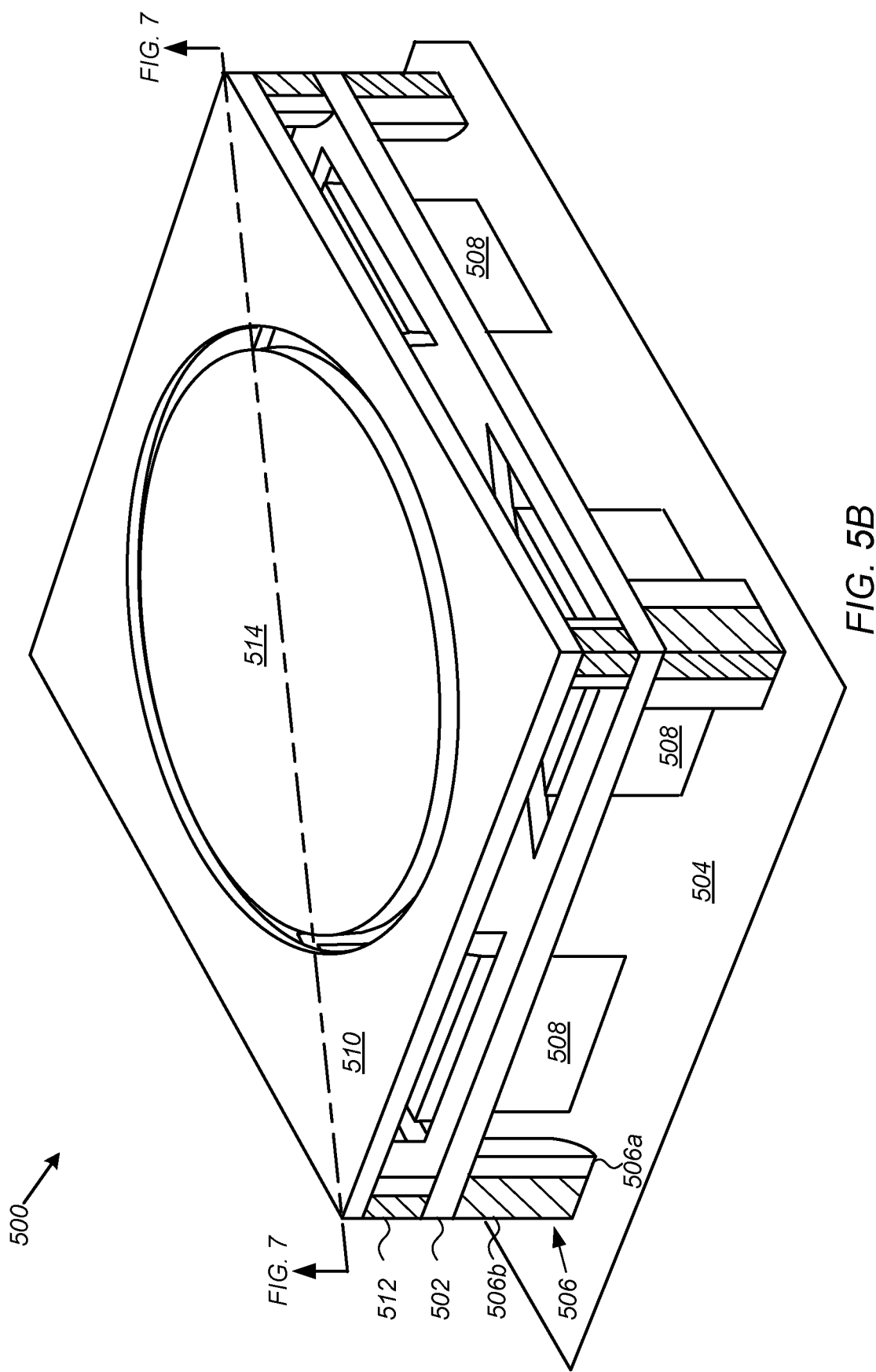
FIG. 5B is a perspective view of an upper MEMS or faceplate layer including a reflector coupled to a piston of the piston layer, wherein the thermal sinking structures extend through the piston layer to a position under the faceplate to provide thermal management of the faceplate layer according to an embodiment of the present disclosure.

FIG. 5B is a perspective view of a complete PLV™ similar in structure to that of FIG. 5A and further including a second MEMS or faceplate layer 510 including a reflective top surface suspended above the piston layer 502 by second posts 512 and a mirror 514 formed either on or above and attached to the piston 502a of the piston layer. As with the first posts 506, the second posts 512 can include an annular structure including an outer or first material surrounding either a substantially hollow inner region or, as shown, a second material. As in PLVs™ described above, in the embodiment shown in FIG. 5B the mirror is substantially co-planar with an upper surface of the faceplate layer 510 when the PLV™ is in a quiescent or unpowered state and the piston 502a is not deflected. However, it will be understood that this placement of the mirror 514 in the state can be changed without changing or adversely impacting the structures and methods of the present invention. In particular, it is noted that mirror 514 can be positioned above or below the reflective top surface of the faceplate layer 510 by an even or odd multiple of one quarter (¼) wavelength of light modulated by the PLV™ to provide either constructive or destructive interference with light reflected from the reflective top surface of the faceplate layer and/or to modulate a phase of the reflected light. In the embodiment shown in FIG. 5A the thermal sinking structures 508 include ends or upper surfaces which terminate proximal to the faceplate layer 510 to provide thermal management of the faceplate layer as well as improved thermal management of the piston layer of the PLV™

Figure 5C:
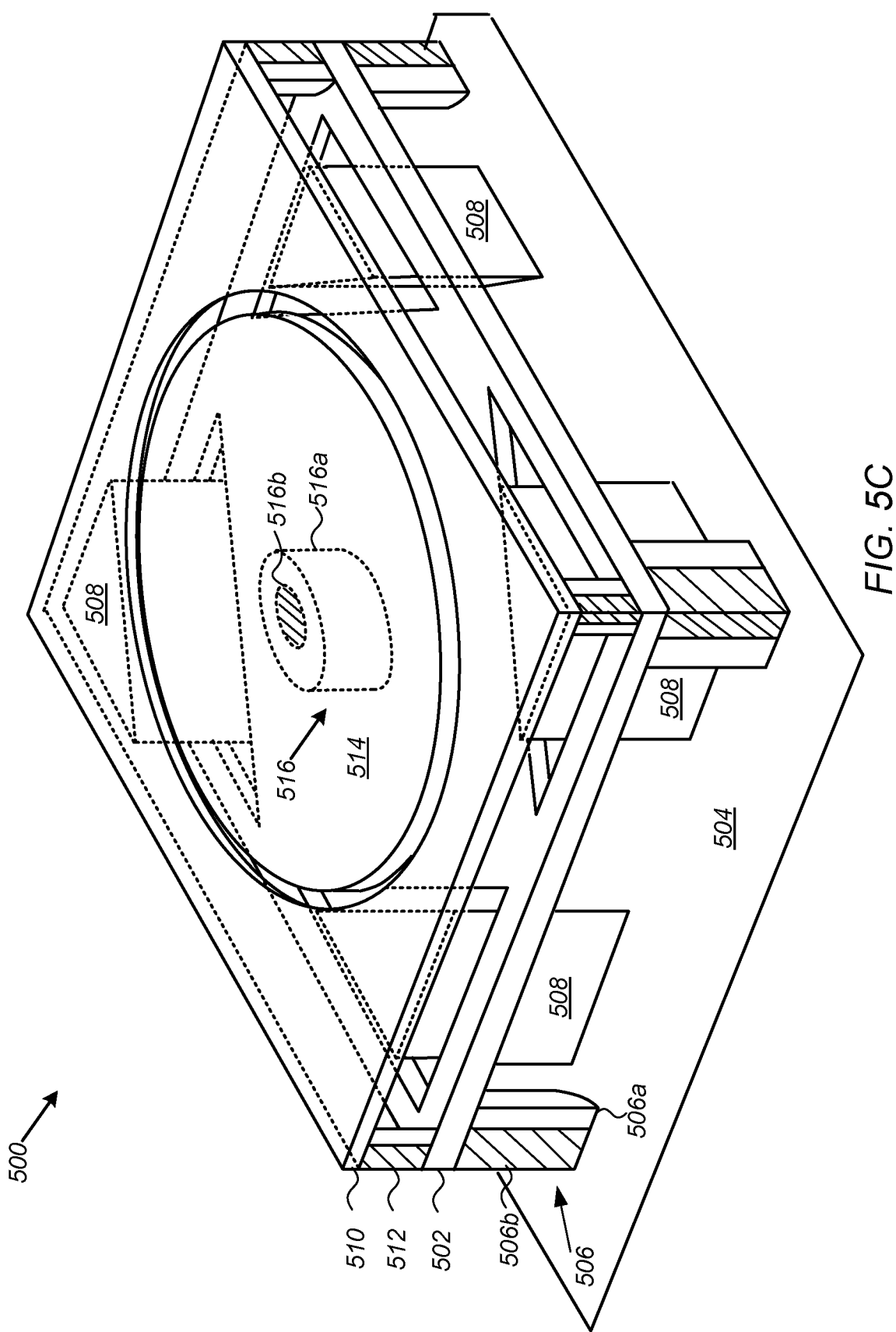
FIG. 5C is a see through, perspective view of the faceplate layer, wherein the thermal sinking structures extend through the piston layer to physically connect to the faceplate layer to support and provide thermal management of the faceplate layer according to an embodiment of the present disclosure.
Figure 5D:
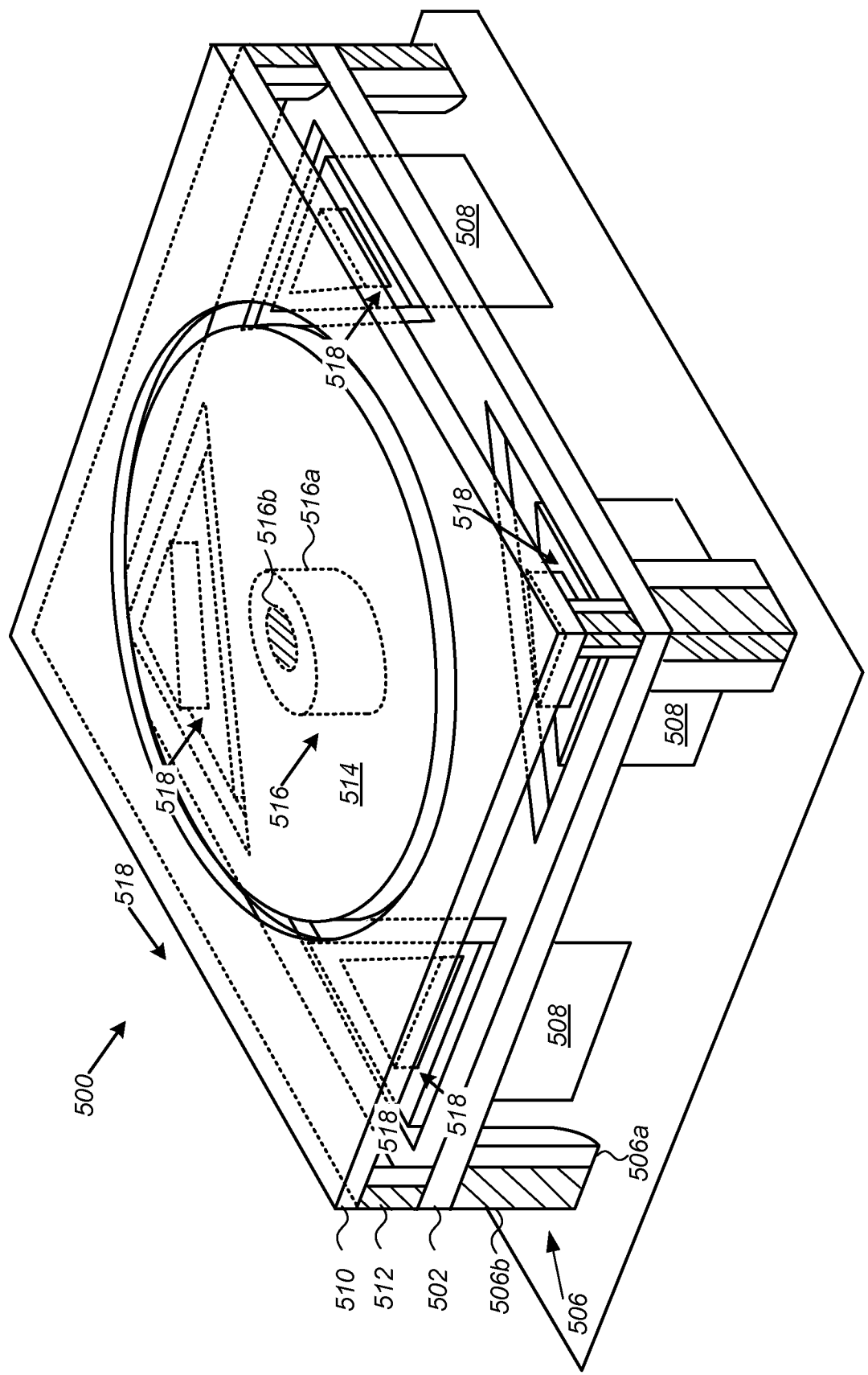
FIG. 5D is a see through, perspective view of the PLV™ in which shading emphasizes the annular, or two part structure of the thermal sinking structures linking the faceplate to the substrate according to an embodiment of the present disclosure.

FIG. 5C is a see through, perspective view of the PLV™ including a faceplate layer 510 suspended above the piston layer 502 (shown in phantom), suspended above the surface of the substrate 504 by posts 512 in four corners of the PLV™, and including large, thermal sinking structures 508 extending through or past the piston layer to terminate proximal to or in contact with a faceplate. As described above, the thermal sinking structures 508 can include an annular-ring shape comprising first and second materials. It is further noted that this design, i.e., a post having an annular-ring shaped cross-section, can also be applied to the posts 506, 512 at the four corners of the PLV™

FIG. 5C also illustrates a central post 516 (shown in phantom) supporting the mirror 514 above the piston layer 502, and, optionally, to provide thermal management of the mirror. In the embodiment, shown the central post 516 has an annular-ring shaped cross-section including an annular-ring of first material 516a surrounding either a substantially hollow inner region or an inner core of a second material 516b. As with the thermal sinking structures 508, the first and second materials of the central post 516 can include a dielectric, conductive, or semiconductor material. In one embodiment, the central post 516 includes SiGe surrounding a core of Ge. Previously, it was not possible enlarge the size of the posts 506, 512, without creating dimples on a surface of the faceplate layer 510, mirror 514 or piston layer 502. Thus, sizes of the posts 506, 512, 516 were limited by a thickness of the piston or mirror and faceplate layers in order to provide a smooth, substantially planar top surface.

FIG. 5D is a see through, perspective view of the PLV™ similar to that shown in FIG. 5C wherein the thermal sinking structures 508 include a 'step' shape or step 518 cross-section in which only a portion of the thermal sinking structures extend past the piston layer 502 either to a point proximal to the faceplate layer 510 or, as in the embodiment shown, in contact therewith. This step 518 serves to maximize the size of the portion of the thermal sinking structure 508 coplanar with the piston layer, while ensuring adequate clearance between the mirror 514 and the portion of the thermal sinking structures 508 extending past the piston layer 502 to the faceplate layer 510. Thus, improved thermal management is provided by sizing and positioning the thermal sinking structures 508 in proximity to moving structures, such as the mirror 514 and piston layer 502, and in contact with non-moving structures, such as the faceplate layer 510.

In another aspect the present disclosure is directed to a process or method of forming thermal sinking structures, corner posts and/or central posts or supports of a PLV™ having a large cross-sectional area in a plane parallel to a surface of a substrate on or over which the PLV™ is formed. Preferably, the thermal structures, corner posts or central post are formed without detrimentally impacting the planarity of a surface subsequently formed thereover, and without the need for additional deposition and/or planarization steps.

A process flow for fabricating a PLV™ including thermal sinking structures and a large central post will now be described with reference to the flow chart of FIG. 6 and the block diagrams of FIGS. 7A through 7F. FIGS. 7A through 7F are sectional block diagrams illustrating a process flow for fabricating a PLV™ including thermal sinking structures and a large, thermal ring post to provide taken along the line 7 in FIG. 5B.

Figure 6:
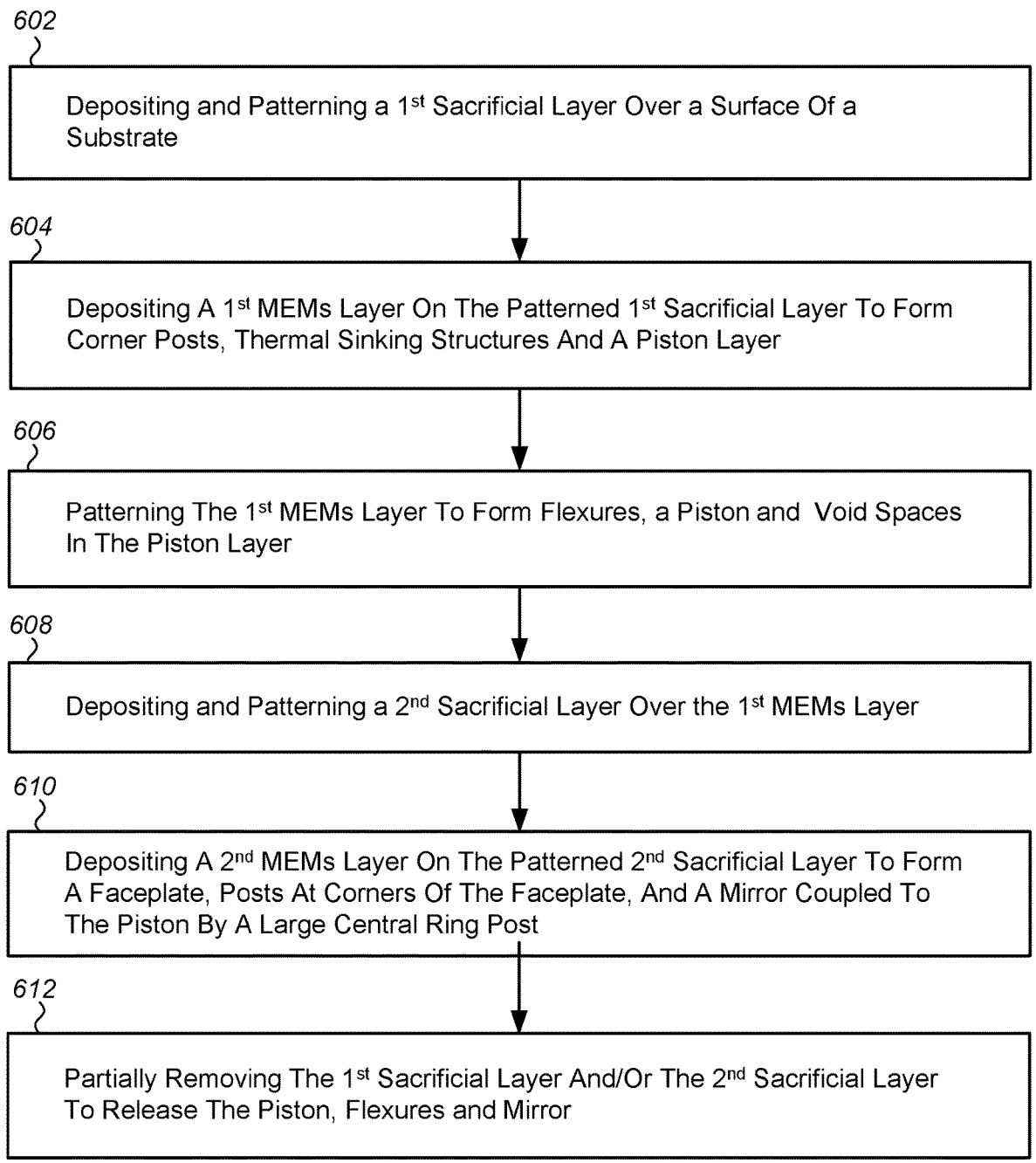
FIG. 6 is a flowchart of a method for fabricating a PLV™ including large, thermal sinking structures and a large, thermal ring post according to an embodiment of the present disclosure.
Figure 7A:
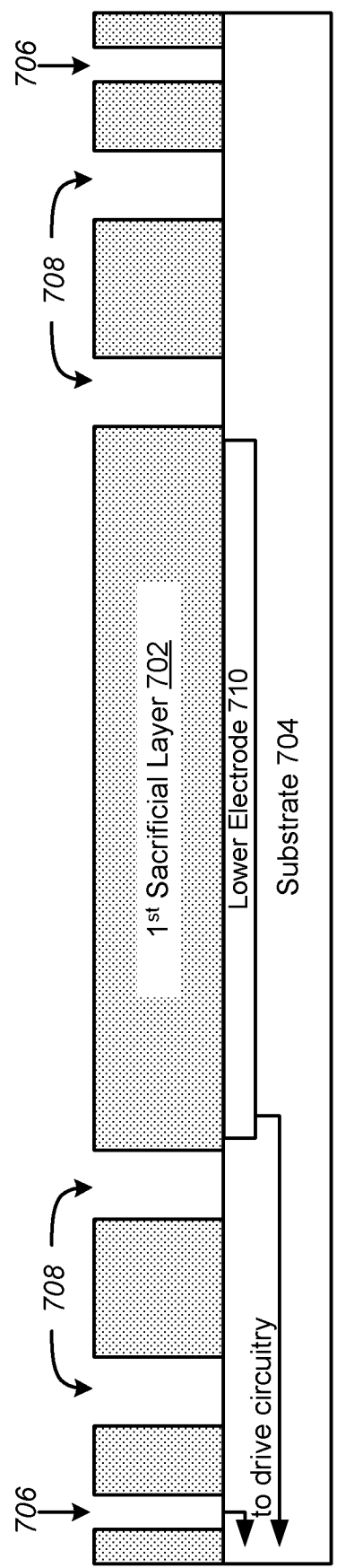
FIG. 7A is a block diagram illustrating a patterned $1^{st}$ sacrificial layer deposited in a process flow for fabricating a PLV™ including thermal sinking structures and a large, thermal ring post to provide improved thermal management according to an embodiment of the present disclosure.

Referring to FIG. 6 and FIG. 7A, the process begins with deposition of a $1^{st}$ sacrificial layer 702 over in or over a dielectric layer (not shown) on a surface of a substrate 704 (step 602). Suitable materials for the sacrificial layer 702 can include germanium (Ge), amorphous or polycrystalline silicon, and can be deposited using any semiconductor or MEMS fabrication technology including, for example, chemical vapor deposition (CVD), plasma enhanced CVD (PECVD), and atomic layer deposition (ALD). The $1^{st}$ sacrificial layer 702 is patterned to form openings 706 for corner posts (506 in FIG. 5) and openings 708 for the thermal sinking structures (508 in FIG. 5). The 1st sacrificial layer 702 is patterned by depositing a mask layer (not shown) over the $1^{st}$ sacrificial layer and partially etching the mask layer to form the openings 706, 708, to yield the structure shown in FIG. 7A. The mask layer can include a hardmask of a dielectric material, such as silicon nitride or oxide, or a photoresist mask, and is deposited and patterned using standard photolithographic techniques. The sacrificial layer 702 can be etched using a wet or dry etch, using a etch chemistry selective to materials of the substrate, the masking layer and the underlying substrate 704.

As noted above the corner posts 506 and the thermal sinking structures 508 can comprise annular structures including an outer first material and an inner hollow core or a second material, as in the embodiment shown, or solid, homogeneous structures (not shown). Preferably, as in the embodiment shown, the substrate has formed therein prior to the deposition of the $1^{st}$ sacrificial layer a lower electrode 710, and electrical connections from the lower electrode and at least one of the posts (506 in FIG. 5) to drive circuitry integrated in or electrically coupled to the substrate 704.

Figure 7B:
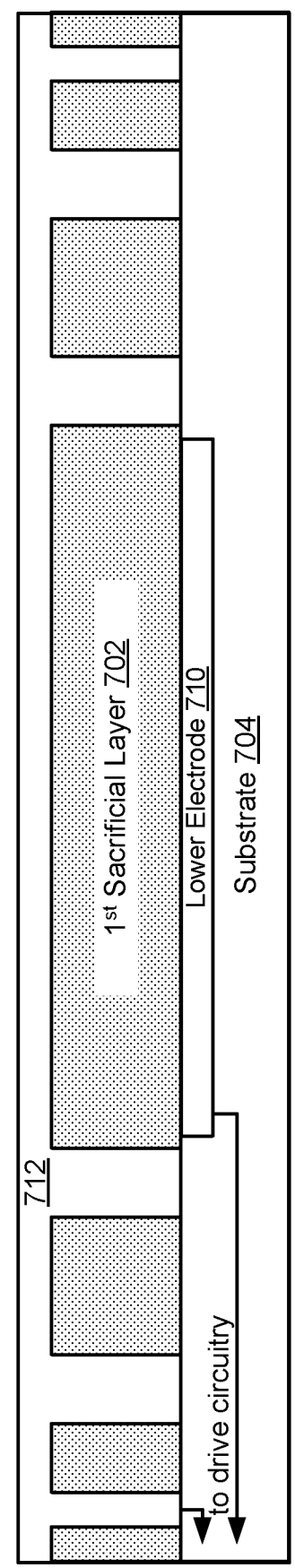
FIG. 7B is a block diagram illustrating a $1^{st}$ MEMs layer deposited on the $1^{st}$ sacrificial layer in a process flow for fabricating a PLV™ including thermal sinking structures and a large, thermal ring post to provide improved thermal management according to an embodiment of the present disclosure.

Next, referring to FIG. 6 and FIG. 7B a mechanical or $1^{st}$ MEMs layer 712 is deposited on the $1^{st}$ sacrificial layer 702 to fill the openings 706, 708, and form the posts (506 in FIG. 5), the thermal sinking structures (508 in FIG. 5), and piston layer (502 in FIG. 5) (step 604). The $1^{st}$ MEMs layer 712 can include an electrically conductive material, such as silicon germanium, to serve as a piston electrode and an electrical interconnect between the piston electrode and the drive circuit through the posts. Suitable materials for the $1^{st}$ MEMs layer 712 can include silicon germanium (SiGe) or silicon nitride (SiN), and can be deposited using CVD, PECVD or ALD.

Figure 7C:
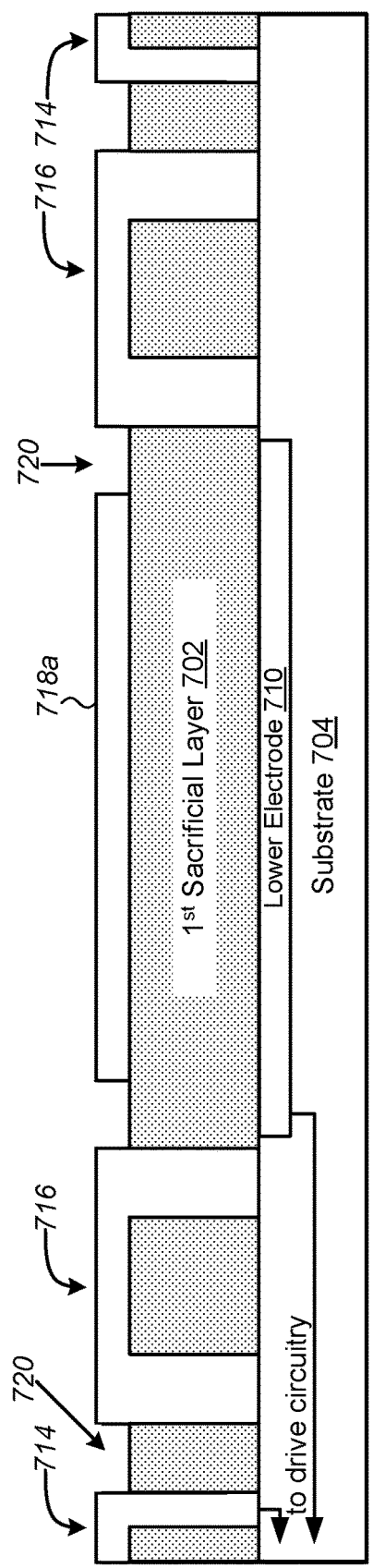
FIG. 7C is a block diagram illustrating patterning of the $1^{st}$ MEMs layer in a process flow for fabricating a PLV™ including thermal sinking structures and a large, thermal ring post to provide improved thermal management according to an embodiment of the present disclosure.

Referring to FIG. 6 and FIG. 7C the $1^{st}$ MEMs layer 712 is then patterned to form at least upper surfaces of corner posts 714 and thermal sinking structures 716, and a piston layer including flexures (not shown), a piston 718a and void spaces 720 between the flexures, piston and thermal sinking structures (step 606). The $1^{st}$ sacrificial layer 702 is patterned to form openings 706 for corner posts (506 in FIG. 5) and openings 708 for the thermal sinking structures (508 in FIG. 5). Generally, the $1^{st}$ MEMs layer 712 is patterned by forming a patterned mask layer (not shown) over the $1^{st}$ MEMs layer and partially etching the $1^{st}$ MEMs layer to yield the structure shown in FIG. 7C. The mask layer can include a hardmask of a dielectric material, such as silicon nitride or oxide, or a photoresist mask, and is deposited and patterned using standard photolithographic techniques. The $1^{st}$ MEMs layer 712 can be etched using a wet or dry etch, using a etch chemistry selective to materials of the masking layer and the underlying $1^{st}$ sacrificial layer 702.

Figure 7D:
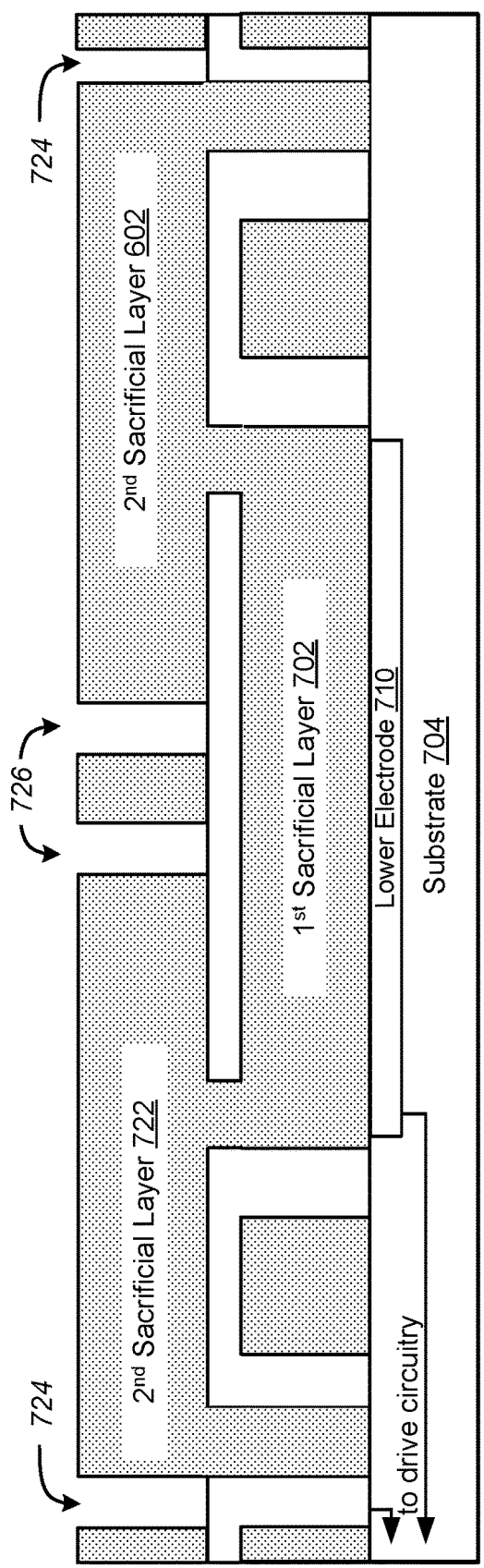
FIG. 7D is a block diagram illustrating a patterned $2^{nd}$ sacrificial layer deposited and patterned in a process flow for fabricating a PLV™ including thermal sinking structures and a large, thermal ring post to provide improved thermal management according to an embodiment of the present disclosure.

Next, referring to FIG. 6 and FIG. 7D a $2^{nd}$ sacrificial layer 722 is deposited over the 1st MEMs Layer and patterned (step 608). The $2^{nd}$ sacrificial layer 722 can include any suitable material used in semiconductor or MEMS fabrication, such as germanium (Ge), amorphous or polycrystalline silicon, and can be deposited using any suitable technology including, for example, CVD, PECVD and ALD. In one embodiment, the $2^{nd}$ sacrificial layer 722 can include the same material as the 1st sacrificial layer 702 to facilitate subsequent removal of all or part of the $1^{st}$ and $2^{nd}$ sacrificial layers in a single etch or release step. Generally, the $2^{nd}$ sacrificial layer 722 is patterned to form openings 724 for corner posts (512 in FIG. 5) to support a faceplate layer (510 in FIG. 5) and openings 726 for the thermal ring post (516 in FIG. 5). As shown, the openings 724 for the corner posts (512 in FIG. 5) can be sized and shaped to yield corner posts having an annular structure including an outer first material surrounding either a substantially hollow inner region or a second material. As with the 1$^{st}$ sacrificial layer 702, the 2$^{nd}$ sacrificial layer 722 is patterned by forming a patterned mask layer (not shown) thereover and partially etching the 2$^{nd}$ sacrificial layer r to form the openings 724, 726, to yield the structure shown in FIG. 7D. The mask layer can include a hardmask of a dielectric material, such as silicon nitride or oxide, or a photoresist mask, and is deposited and patterned using standard photolithographic techniques. The 2$^{nd}$ sacrificial layer 722 can be etched using a wet or dry etch, using a etch chemistry selective to materials of the masking layer and the underlying 1$^{st}$ MEMs layer 712.

Figure 7E:
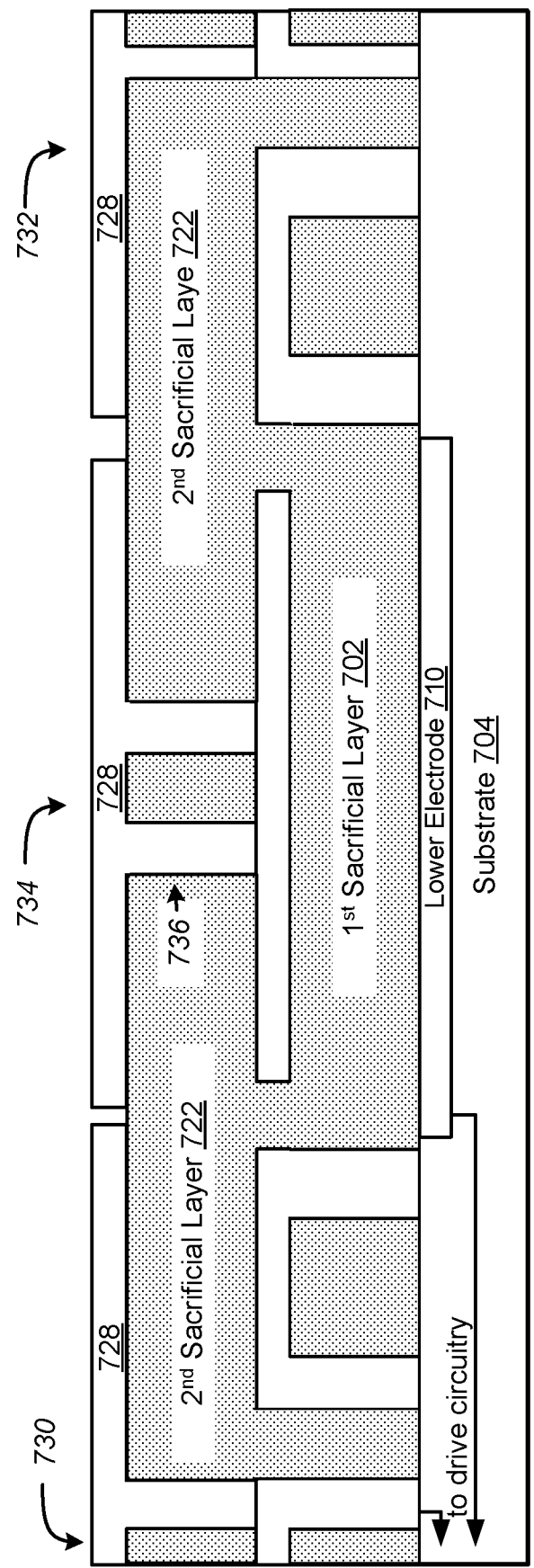
FIG. 7E is a block diagram illustrating a $2^{nd}$ MEMs layer deposited and patterned in a process flow for fabricating a PLV™ including thermal sinking structures and a large, thermal ring post to provide improved thermal management according to an embodiment of the present disclosure.

Referring to FIG. 6 and FIG. 7E a 2$^{nd}$ MEMs layer 728 is deposited on the 2$^{nd}$ sacrificial layer 722 to fill the openings 724, 726, and patterned to form the corner posts 730, faceplate layer 732, mirror 734 and the thermal ring post 736 (step 610). The 2$^{nd}$ MEMs layer 728 can include silicon germanium (SiGe) or silicon nitride (SiN), and can be deposited using CVD, PECVD or ALD. Generally, reflective surfaces or reflectors are formed on top surfaces of the faceplate layer 732 and mirror 734 prior to the patterning. The reflectors can one or more layers of dielectric and/or metallic materials having thicknesses selected to reflect wavelengths of light to be modulated by the finished PLV™. The 2$^{nd}$ MEMs layer 728 is patterned by forming a patterned mask layer (not shown) thereover and partially etching the 2$^{nd}$ MEMs layer and reflectors to yield the structure shown in FIG. 7E. The mask layer can include a hardmask of a dielectric material, such as silicon nitride or oxide, or a photoresist mask, and is deposited and patterned using standard photolithographic techniques. The 2$^{nd}$ MEMs layer 728 can be etched using a wet or dry etch, using a etch chemistry selective to materials of the masking layer and the underlying 2$^{nd}$ sacrificial layer 722.

Figure 7F:
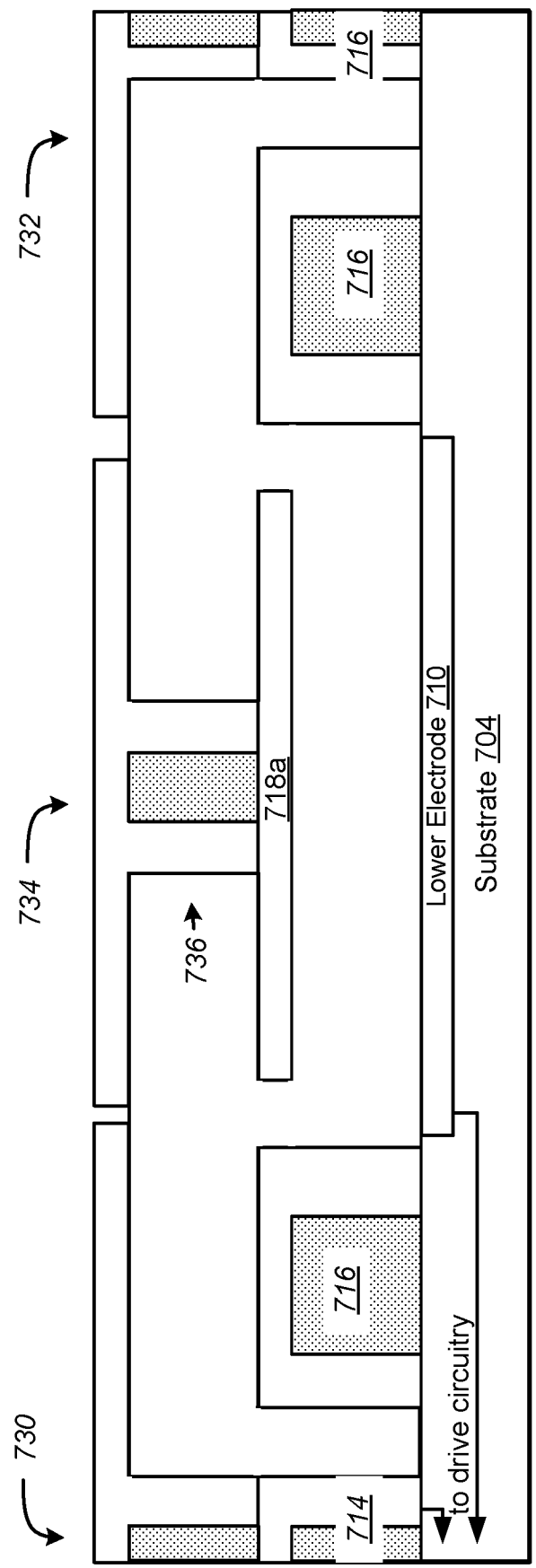
FIG. 7F is a block diagram illustrating a PLV™ including $1^{st}$ and $2^{nd}$ sacrificial layers at least partially removed in a process flow for fabricating thermal sinking structures and a large, thermal ring post to provide improved thermal management according to an embodiment of the present disclosure.

Finally, the remaining portions of the 1$^{st}$ and 2$^{nd}$ sacrificial layers 702, 722 are at least partially removed to release the piston 718a, flexures (not shown in these figures) and mirror 734 and yield the structure shown in FIG. 7F (step 612). As with patterning of the 1$^{st}$ and 2$^{nd}$ sacrificial layers 702, 722 described above, the of the 1$^{st}$ and 2$^{nd}$ sacrificial layers can be removed or etched by a wet etch, using a etch chemistry selective to materials of the 1$^{st}$ and 2$^{nd}$ MEMs layers 712, 728, and the underlying lower electrode 710 and substrate 704.

Referring to FIG. 7F, it is noted that the above process results in lower posts 714 and thermal sinking structures 716 having annular structures and including an, outer, first material, such as SiGe, and an inner, second material, such as Ge. In some embodiments, such as that shown, the inner, second material can include a remaining portion of the 1$^{st}$ sacrificial layer 702. However, it will be understood that in other embodiments either or both of the posts 714 and thermal sinking structures 716 can instead be formed with a hollow inner core by including openings in the structures through which the material of the 1$^{st}$ sacrificial layer 702 can be released. Alternatively, as noted above, either or both of the posts 714 and thermal sinking structures 716 can instead be formed as solid structures having a homogenous composition.

It is noted that the above process results in a thermal ring post 736 having an annular structure and including an, outer, first material, such as SiGe, and an inner, second material, such as Ge, including a remaining portion of the 2$^{nd}$ sacrificial layer 722. It will be understood that the thermal ring post 736 may also be formed with a hollow inner core by including openings in the structures through which the material of 2nd sacrificial layer 722 can be released. However, it is noted that enclosing a portion of the material of the 2$^{nd}$ sacrificial layer 722 enables formation of a thermal ring post 736 having a large cross-section or width, while providing a substantially planar surface to the mirror 734, substantially without creating dimples on a surface of mirror and without the need for additional deposition and chemical mechanical planarizing (CMP) processes.

It is further noted that the above process results in thermal sinking structures 716 having top surfaces that are substantially coplanar with the piston layer as shown in FIGS. 5A and 5B. However, it is noted that this need not be the case in every embodiment. For example, it is possible to expose are even remove the material of the 1$^{st}$ sacrificial layer 702 prior to deposition of the 2$^{nd}$ sacrificial layer 722, and to pattern the 2$^{nd}$ sacrificial layer in step 608 so that the subsequent deposition of the 2$^{nd}$ MEMs layer 728 extends the thermal sinking structures 716 proximal to or connecting with a lower surface of the faceplate layer 732.

Finally, it is noted that by judicious selection of the materials of the 1$^{st}$ and 2$^{nd}$ sacrificial layers 702, 722, and the 1$^{st}$ and 2$^{nd}$ MEMS layers 712, 728, the above process is particularly useful for forming a thermal sinking structure 716, corner posts 714, 730 and/or a central thermal ring post 736 including an annular-ring of a first material surrounding a core of a second material having greater thermal conductivity than the void [e.g. air, gas, vacuum]. It is further noted the materials of the 1$^{st}$ and 2$^{nd}$ sacrificial layers 702, 722, and the 1$^{st}$ and 2$^{nd}$ MEMS layers 712, 728, can be selected to provide a conductive via or outer conductor on the post 714 or thermal sinking structure 716 electrically coupling an electrode (not shown) in an electrostatically deflectable piston 718a to drive circuitry in or coupled to the substrate, and/or to electrically couple the faceplate 732 to a potential or voltage through the substrate 704 to substantially prevent the electrostatically deflectable piston being attracted thereto.

Thus, embodiments of MEMS-based optical modulators with thermal sinking structures to provide improved thermal management, and to methods of manufacturing the same have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Reference in the description to one embodiment or an embodiment means that a particular feature, structure, or characteristic described in connection with the embodiment is included in at least one embodiment of the circuit or method. The appearances of the phrase one embodiment in various places in the specification do not necessarily all refer to the same embodiment.

What is claimed is:

1. A Micro-Electromechanical System (MEMS) device comprising:
   a piston layer suspended over a surface of a substrate by posts at corners thereof, the piston layer including an electrostatically deflectable piston and a number of flexures through which the piston is coupled to the posts;
   a first reflective surface over a top surface of the piston;
   a faceplate suspended over the piston layer, the faceplate including a second reflective surface on a top surface of the faceplate, and an aperture through which the piston exposed; and
   a plurality of thermal sinking structures projecting from the surface of the substrate and extending through void spaces between the posts, the flexures and the piston of the piston layer to provide thermal management of the piston layer,
   wherein the thermal sinking structures substantially fill the void spaces without contacting either the flexures or the piston to provide first thermal gaps separating the thermal sinking structures from the flexures and the piston, and without altering a deflection gap between the piston and the surface of the substrate, and
   wherein electrostatic deflection of the piston brings light reflected from the first reflective surface into interference with light reflected from the second reflective surface.

2. The device of claim 1, wherein the thermal sinking structures extend through the piston layer to a position under the faceplate to provide thermal management of the faceplate layer, and wherein the thermal sinking structures do not contact the faceplate to provide second thermal gaps between the thermal sinking structures and the faceplate.

3. The device of claim 1, wherein the thermal sinking structures extend through the piston layer to connect with the faceplate to suspend the faceplate over the piston layer, and to provide thermal management of the faceplate.

4. The device of claim 3, wherein the thermal sinking structures have an annular cross-section in a plane parallel to the surface of the substrate, and comprise a first material enclosing a second material.

5. The device of claim 4, wherein the second material is electrically conductive to electrically couple the faceplate to an electrical potential of a structure in the substrate.

6. The device of claim 3, wherein the thermal sinking structures have an overall triangular cross-section in the plane parallel to the surface of the substrate.

7. The device of claim 1, wherein the first reflective surface is on a mirror supported above and separated from the piston by a central post extending from the piston to the mirror.

8. The device of claim 7, wherein the central post has an annular cross-section in a plane parallel to the top surface of the piston, and comprises a first material enclosing an open cavity in a center of the central post.

9. The device of claim 7, wherein the central post has an annular cross-section in a plane parallel to the top surface of the piston, and comprises a first material enclosing a second material.

10. A method of fabricating a Micro-Electromechanical System (MEMS) device, comprising:
    depositing and patterning a first sacrificial layer over a surface of a substrate;
    depositing a mechanical layer on the patterned first sacrificial layer to form posts at corners of the MEMS device, and to form a piston layer including a piston and a number of flexures through which the piston is coupled to the posts;
    depositing a second sacrificial layer over the mechanical layer, and patterning the second sacrificial layer and the first sacrificial layer to form openings for a plurality of thermal sinking structures extending from the surface of the substrate;
    depositing a faceplate layer to form a faceplate over the second sacrificial layer and to fill the openings to form the thermal sinking structures; and
    at least partially removing the first sacrificial layer and/or the second sacrificial layer to release the piston layer,
    wherein the thermal sinking structures substantially fill a void spaces in the piston layer between the posts, the flexures and the piston of the piston layer without contacting either the flexures or the piston to provide first thermal gaps separating the thermal sinking structures from the flexures and the piston, without altering a deflection gap between the piston and the surface of the substrate, and
    wherein patterning the first and/or second sacrificial layer to form openings for the thermal sinking structures comprises forming openings having an annular cross-section in a plane parallel to the surface of the substrate, and wherein filling the openings comprises filling the openings with a first and/or second material enclosing a portion of material of the first and/or second sacrificial layer.

11. The method of claim 10, wherein the material of the first and second sacrificial layers have greater thermal conductivity than a surrounding gas.

12. The method of claim 10, wherein the first material comprises silicon germanium (SiGe) and the material of the first and second sacrificial layers germanium (Ge).

13. A two-dimensional spatial light modulator comprising:
    a piston layer suspended over a surface of a substrate by posts at corners thereof, the piston layer including an electrostatically deflectable piston and a number of flexures through which the piston is coupled to the posts;
    a faceplate suspended over the piston layer, the faceplate including an aperture through which the piston exposed; and
    a plurality thermal sinking structures projecting from the surface of the substrate and extending through void spaces between the posts, the flexures and the piston of the piston layer to connect with the faceplate to suspend the faceplate over the piston layer, and to provide thermal management of the faceplate,
    wherein the thermal sinking structures have an annular cross-section in a plane parallel to the surface of the substrate, and comprise a first material enclosing a second material, and has a greater thermal conductivity than the first material.

14. The modulator of claim 13 wherein the second material is electrically conductive to electrically couple the faceplate to an electrical potential of a structure in the substrate.

15. The modulator of claim 13 wherein the thermal sinking structures substantially fill the void spaces without contacting either the flexures or the piston to provide thermal management of the piston layer, and wherein thermal gaps separating the thermal sinking structures from the flexures and the piston, and without altering a deflection gap between the piston and the surface of the substrate.

16. The modulator of claim 13 further comprising a first reflective surface on a top surface of the faceplate, and a second reflective surface over the a top surface of the piston, and wherein electrostatic deflection of the piston brings light reflected from the first reflective surface into constructive or destructive interference with light reflected from the second reflective surface.

17. The modulator of claim 16, wherein the second reflective surface is on a mirror supported above and separated from the piston by a central post extending from the piston to the mirror.

18. The modulator of claim 17, wherein the central post has an annular cross-section in a plane parallel to the top surface of the piston, and comprises a first material enclosing an open cavity in a center of the central post.

19. The modulator of claim 18, wherein the central post has an annular cross-section in a plane parallel to the top surface of the piston, and comprises a third material enclosing a fourth material.

20. The modulator of claim 13 wherein the thermal sinking structures have an overall triangular cross-section in the plane parallel to the surface of the substrate.

* * * * *